United States Patent [19]

Haack et al.

[11] 3,984,597

[45] Oct. 5, 1976

[54] FOAMED THERMOPLASTIC LEATHER AND TEXTILE SUBSTITUTE MATERIAL

[75] Inventors: Dieter Haack, Geschwenda; Harald Kunze, Neumark; Werner Lauterberg, Halle-Neustadt; Jochen Sander, Halle-Neustadt; Werner Taube, Halle-Neustadt; Peter Umbreit, Halle-Neustadt; Gerd Wilde, Halle-Neustadt, all of Germany

[73] Assignee: VEB Leuna-Werke "Walter Ulbricht", Leuna, Germany

[22] Filed: Jan. 27, 1975

[21] Appl. No.: 539,121

Related U.S. Application Data

[63] Continuation-in-part of Ser. No. 476,112, June 3, 1974, abandoned, which is a continuation-in-part of Ser. No. 303,672, Nov. 2, 1972, abandoned.

[52] U.S. Cl. ............................. 428/220; 428/310; 428/332; 428/904
[51] Int. Cl.² ...................... B32B 3/26; D06N 7/04
[58] Field of Search ............ 428/220, 310, 332, 904

[56] References Cited

UNITED STATES PATENTS

| 3,574,021 | 4/1971 | Van Buskirk | 428/904 |
| 3,779,855 | 12/1973 | Fonzi | 428/904 |

*Primary Examiner*—William J. Van Balen
*Attorney, Agent, or Firm*—Nolte and Nolte

[57] ABSTRACT

An unsupported leather or textile substitute in the form of a cellular porous unsupported sheets having:
A. A thickness of 1 to 3 mm;
B. A density of 0.25 to 0.60 g/cm³;
C. An average cell diameter size of 60 to 200 microns;
D. A tensile strength between 10 and 60 kg/cm²;
E. A tear propagation strength between 4 and 10 kg/cm;
F. A flexibility of 10 to 100 g . cm
G. A water vapor permeability of 20 to 200 mg/1000 mm².day;
H. A scratch resistance with 0.8 kg load of at least 40 strokes.

13 Claims, 3 Drawing Figures

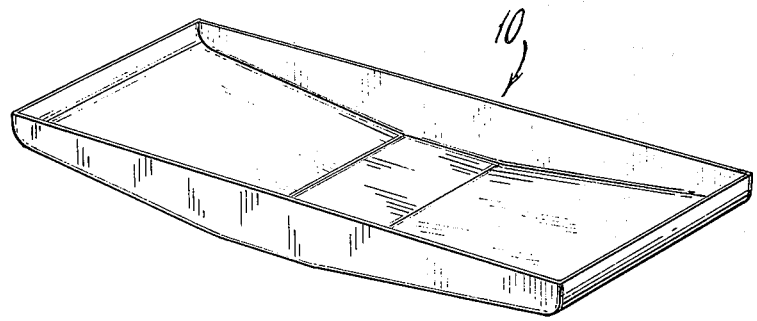
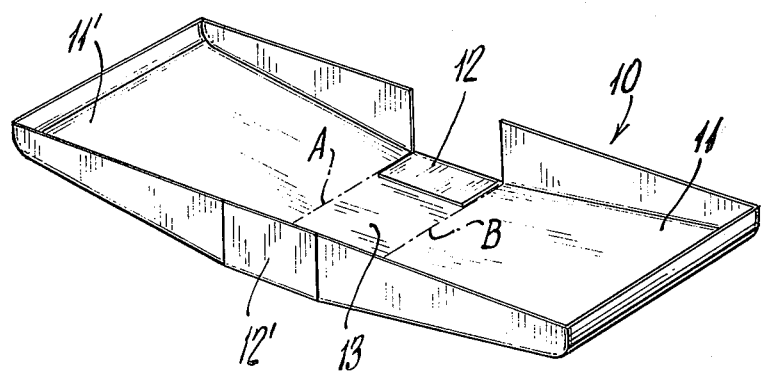
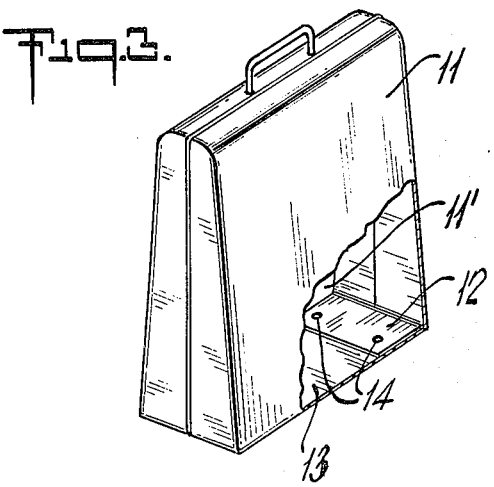

FOAMED THERMOPLASTIC LEATHER AND TEXTILE SUBSTITUTE MATERIAL

CROSS REFERENCE TO RELATED APPLICATIONS

This is a continuation-in-part of copending application Ser. No. 476,112, filed June 3, 1974, now abandoned which, in turn, is a continuation-in-part of abandoned application Ser. No. 303,672, filed Nov. 2, 1972.

THE INVENTION AND ITS BACKGROUND

This invention relates to leather textile substitute materials based upon thermoplastic materials. More particularly, it relates to unsupported cellular sheet-like thermoplastic materials for use in handbags, sports goods, fancy goods, and other goods usually produced from artificial leather as leather or textile substitutes.

It is known to make leather and textile substitute from polyvinyl chloride or polyurethanes. These materials are predominantly used bonded to support a material, especially textiles. In the production of these materials, polyvinyl chloride paste, has been coated on to a support material and subsequently gelled out at elevated temperature. Alternatively, a reactive polyisocyanate mixture and a mixture of hydroxyl group containing polyesters, polyethers and polyvalent alchohols have been employed by depositing them on a support material and thereafter affecting a reaction. Methods for the production of these leather or textile substitutes require costly processing.

The known leather and textile substitute materials made from polyvinyl chlorids or polyurethane cannot be used without support as these polymeric materials themselves do not have sufficient stability. The substitute materials on supports are not capable of being deep drawn; i.e., are not capable of being formed into an article by the deep drawing process wherein the material in sheet form is drawn deeply by use of a vacuum into a cavity.

Additionally, polyvinyl chloride does not have sufficient "breathing" activity; i.e., it does not have sufficient porosity to permit air to pass through. Additionally, polyvinyl chloride suffers from the decisive disadvantage in that there is substantial plasticizer migration. This is true even in the case of foamed polyvinyl chloride which breaks down and becomes brittle at low temperatures.

It has, therefore, become an object of the present invention to provide a thermoplastic based leather or textile substitute material which has excellent porosity and breathing ability. Moreover, it has become desirable to provide a textile or leather substitute material having improved density, excellent tear propagation and tensile strength. Still moreover, it has become desirable to provide such a material with good flexibility whereby the combination of these properties allows one to dispense with the normal support materials. It has also become an object of the present invention to provide a thermoplastic leather or substitute material which has low weight and high resistance to cold, good breathing activity, high flexibility, good dirt repelling action, good mechanical strength and stability and easy fabricability by deep drawing, welding, and gluing.

THE INVENTION

The objects of the present invention are answered by an unsupported leather or textile substitute in the form of a cellular porous unsupported sheet having:
A. a thickness of 1 to 3 mm;
B. a density of 0.25 to 0.60 g/cm$^3$;
C. an average cell diameter size of 60 to 200 microns;
D. a tensile strength between 10 and 60 kg/cm$^2$;
E. a tear propagation strength between 4 and 10 kg/cm$^2$; and
F. a flexibility of 10 to 100 g . cm
G. a water vapor permeability of 20 to 200 mg/1000 mm$^2$ . day;
H. a scratch resistance with 0.8 kg load of at least 40 strokes;

wherein said sheet consists essentially of a resinous foamed material, the resin of which consists of a member selected from the group consisting of:

1. A polyethylene having a density of 0.910 to 0.925 g/cm$^2$ and a melting index $i_2$ of 1.1 to 15.0 g/10 min;
2. an ethylene vinylacetate copolymer containing 5 to 20 % by weight of vinylacetate and having a density of 0.920 to 0.940 g/cm$^3$ and a melting index $i_2$ of 1.1 to 10.0 g/10 min;
3. a mixture of the polyethylene of paragraph 1 and the ethylene vinylacetate copolymer of paragraph 2 said mixture having a total content of vinylacetate to 15 % by weight;
4. a mixture of the polyethylene of paragraph 1 and the ethylene vinylacetate copolymer of paragraph 2 and an ethylene vinylacetate copolymer containing 30 to 35 % by weight of vinylacetate and having a density of 0.950 to 0.960 g/cm$^3$ and a melting index $i_2$ of 1.1 to 10.0 g/10 min, said mixture having a total content of vinylacetate to 15 % by weight;
5. a partly saponified ethylene vinylacetate copolymer produced from the ethylene vinylacetate copolymer of paragraph 2 containing less than 1.5 % by weight of saponified vinylacetate groups;
6. a mixture of the polyethylene of paragraph 1 and the partly saponified ethylene vinylacetate copolymer of paragraph 5;
7. a completely saponified ethylene vinylacetate copolymer produced from the ethylene vinylacetate copolymer of paragraph 2;
8. a mixture of the polyethylene of paragraph 1 and the completely saponified ethylene vinylacetate copolymer of paragraph 7;
9. a mixture of ethylene vinylacetate copolymers having different contents of vinylacetate said mixture having a total content of vinylacetate of 5 to 20 % by weight;
10. a mixture of the ethylene vinylacetate copolymer of paragraph 2 and the partly saponified ethylene vinylacetate copolymer of the paragraph 5;
11. a mixture of the ethylene vinylacetate copolymer of paragraph 2 and the completely saponified ethylene vinylacetate copolymer of paragraph 7;
12. a mixture of the polyethylene of paragraph 1 the ethylene vinylacetate copolymer of paragraph 2 and the completely saponified ethylene vinylacetate copolymer of paragraph 7;
13. a mixture of 20 to 99 % by weight polyvinyl chloride having an average molecular weight of 55,000 to 75,000 and 1 to 80 % by weight of the ethylene vinylacetate of paragraph 2, said composition containing up to 20 % by weight of an agent selected from the group consisting of polyamide, polycondensate, reinforcing material, antistatic agent, softener, stabilizer, dye and pigment. Preferably, the leather substitute material of the invention has a water vapor permeability of 20 to 200 mg/1000 mm$^2$.day and a scratch resistance with a 0.8 kg load of at least 40, preferably 50–80 strokes.

According to the present invention, it has been discovered that excellent leathers or textiles substitute material can be provided which have excellent physical and chemical properties that can be utilized without a support by selecting the appropriate chemical substituents to be utilized. According to the invention, certain specifically selected thermoplastic materials are utilized to form a foamed, cellular, porous, unsupported sheet. In accordance with one mode of the present invention, an ethylene vinylacetate copolymer is utilized having a vinylacetate content of 5 to 14 % by weight, a density of 0.920 to 0.940 g/cm$^3$ and a melting index $i_2$ of 1.1 to 10.0 g/10 min. This ethylene vinylacetate copolymer can be used alone or in a mixture with a specific type of polyethylene, i.e., a polyethylene having a density of 0.910 to 0.925 grams cubic centimeter. When such a polyethylene is used, it must also have a melt index of 1.1 to 15.0 grams per 10 min. It has been found that highly desirable polyolefin foam sheets consists in a mixture of said polyethylene with a partly saponified ethylene vinylacetate copolymer containing less than 1.5 % by weight of saponified vinylacetate groups. It is preferred that such a composition contains between 25 and 75 % by weight polyethylene, between 75 and 25 % by weight partly saponified ethylene vinylacetate copolymer containing less than 1.5 % saponified vinylacetate groups. Particularly desirable is to use a mixture of 20 to 50 % by weight of said polyethylene, 40 to 25 % by weight of ethylene vinylacetate copolymer and 40 to 25 % by weight of completely saponified ethylene vinylacetate copolymer. The completely saponified ethylene vinylacetate copolymer is produced by saponification of ethylene vinylacetate copolymer containing 5 to 20 % by weight of vinylacetate.

Another particularly desirable form of such a sheet of ethylene vinylacetate copolymer and saponified ethylene vinylacetate copolymer is one which consists of the mixture of 40 % by weight polyethylene, 40 % by weight of ethylene vinylacetate copolymer with a vinylacetate content of 5 to 7 % by weight and 20 % by weight of an ethylene vinylacetate copolymer with a vinylacetate content between 30 and 35 % by weight.

Highly desirable forms of the leather and textiles substitute of the present invention are provided by a mixture of 25 to 75 % by weight of the above defined polyethylene and 75 to 25 % by weight of an ethylene vinylacetate copolymer having vinylacetate content of 2 to 15 by weight.

In another mode of the present invention, a leather and/or textile substitute is provided having a major amount of ethylene vinylacetate of one particular vinylacetate content in a mixture with an ethylene vinylacetate copolymer of a different vinylacetate content. For instance, a leather and textile substitute material of the present invention is provided by a mixture of 50–99% by weight of an ethylene vinylacetate copolymer with a vinylacetate content of 5 to 10 % by weight and 50 to 1 % by weight of an ethylene vinylacetate copolymer of a vinylacetate content of 10 to 20 % by weight.

Another particularly desirable leather or textile substitute of the present invention is one which contains a large quantity of polyvinyl chloride in the mixture with ethylene vinylacetate copolymer. A suitable mixture for use in the present invention is one which comprises between 50 and 80 % by weight of polyvinyl chloride of molecular weight between 60,000 and 65,000 and between 50 and 20 % by weight of ethylene vinylacetate copolymer of vinylacetate content of 5 to 35 % by weight. An especially desirable leather or textile substitute of the present invention is one which comprises 70 % by weight of polyvinyl chloride of molecular weight between 60,000 and 65,000 and 30 % by weight of ethylene vinylacetate copolymer with vinylacetate content of 5 to 35 % by weight.

The leather substitute materials of the present invention are generally porous to air and have an average cell size of 60 to 200 microns. The material is formed by an extrusion process in which foaming takes place. The formation of the unsupported foamed sheet of the present invention is carried out by admixing in an extruder a foaming agent in an amount of 3 to 10 % by weight preferably 4 to 6 % by weight based on the weight of the employed resinous material. Preferably the foaming material is a volatile solvent which under extrusion conditions evaporates permitting the vapors to have a foamforming effect. Suitable volative solvents for this purpose include hydrocarbons, chlorohydrocarbons, fluorochlorohydrocarbons or liquid carbon dioxide. Nucleation agents are used to control cell size and increase fine cellularity. Especially suitable is the use of a mixture of 1 part citric acid and 1 to 1.5 parts sodium bicarbonate in an amount of 0.15 to 0.5 % by weight preferably 0.25 to 0.35 % by weight based on the weight of the employed resinous material. Antistatic agents improving the dirt repellent properties are admixed in an amount of 0.2 to 0.5 % by weight preferably 0.4 % by weight based on the weight of the employed resinous materials. Usefull as antistatic agents are ethoxylated dodecylalcohol or ethoxylated sperm oil in mixture with fat alcohols. In one particularly desirable embodiment, there is included in the foamable, resinous mass a polyamide or a polycondensate in an amount to 20 % by weight based on the employed resinous materials. Polyamides suitable for the process of our invention are poly-caprolactame or modifications of this polyamide. Suitable polycondensates are urea-formaldehyde resins, phenol-formaldehyde resins, ketone-formaldehyde resins, melamine resins and their modifications.

The mixture is heated therein. The pressure of the substance against the die of the extruder increases to between about 50 and 150 kg/cm$^2$ preferably 70 to 90 kg/cm$^2$. The material thereafter passes through the die orifice of the extruder at which time the volatile solvent in the foamable mass evaporates providing a foamed sheet of between 1 and 3 mm thick having a density between 0.25 and 0.40 g/cm$^3$.

Specific Embodiment

The unsupported foamed sheet for use as leather and textile substitute material in the invention is produced by an extrusion foaming process. The mixture of polymer, nucleating agent and antistatic agent as described above, produced in a mixer, is supplied to an extruder. A liquid foaming agent is proportioned into the cylinder of the extruder. The polymer foaming agent mixture, which is under high pressure, is extruded through an annular die into a zone of lower pressure (generally atmospheric pressure), whereby it is foamed. The resultant foamed tube is pulled over a cooling mandrel, cut open by means of a separately driven roll knife below, laid widthwise, and rolled up.

Advantageously, there is used as the leather and textile substitute material an unsupported foamed sheet which is produced by mixing the polymers, optionally together with one or more of thermosetting resins, fillers, reinforcing agents, plasticizers, stabilizers and pigments or dyes, with nucleating agents and antistatic agents and subsequently extruding the mixture with a foaming agent.

The leather and textile substitute material of the invention is well suited for the production of luggage goods. To improve the abrasion and scratch resistance, the surface of the foamed foil may be embossed as an after-treatment. One surface of the foamed foil is subjected to a heating zone, causing the surface to begin to melt, while the opposite zone being effected for example by a cooling coil. The incipiently fused surface is compressed by embossing to form a closed layer. The temperature of the embossing roller should be taken as high as possible and the subsequent cooling of the embossed surface is effected slowly and in steps, in order to increase the degree of crystallization at the surface and hence the scratch resistance. The resulting foamed foil has good scratch resistance, little tendency to soil, and an esthetically pleasing appearance. The surface is closed, pore-free, smooth, shiny and wipable.

The production of the luggage goods can take place in a technically simple manner by fabricating the foamed foil directly into shaped parts by known shaping methods for thermoplastics.

Preferably, the production of the luggage goods is effected from one or more molded blanks. Patters can be applied during the shaping process on the visible surface of the luggage goods by inserting matrices, e.g. in the form of expanded metal or reliefs, or by engraving the mold walls.

The leather and textile substitute material of the invention is uniform and fine-celled in foam structure. It has a low density, good breathing activity, good mechanical strength and flexibility. Because of its stability it can be used without support. Its good flexibility down to temperatures of −60° C insures high resistance to cold. The leather and textile substitute material is very pliable and is suitable for the production of luggage goods, and outer clothing. It fabricates well by gluing, sewing, welding and deep drawing.

The invention will now be further described by reference to the examples and drawings, in the latter of which:

FIG. 1 is an isometric view of a bag blank produced by deep drawing a foamed polyolefin foil of the invention;

FIG. 2 is a view like FIG. 1 but the blank now having been subjected to cutting and creasing; and FIG. 3 is an isometric of the completed bag.

The blank 10, after being formed by deep drawing, is cut to form reinforcing flaps 12 and 12' and creased along lines A and B, which are aligned with the cuts. Reinforcing flap 12 is shown in FIG. 2 after having been folded down; the same operation is performed on flap 12'. The bottom 13 of the bag is defined by the area between the fold lines A and B. The remaining extremities of the blank define the sides 11 and 11' of the bag. The reinforcing flaps 12 and 12' are held in place by fasteners 14.

EXAMPLE 1

Ethylene-vinylacetate copolymer having a vinylacetate content of 5 % was mixed with 0.1 % by weight citric acid, 0.1 % by weight sodium bicarbonate and 0.4 % by weight of an antistatic agent consisting in a mixture of etoxylated sperm oil derivative and fat alcohols. These materials were subsequentially charged into and extruded. To the fused mixture of polymer and nucleating agent was also added a propellant mixture consisting of 80 % by weight dichlorodifluoromethane and 20 % trichloromonofluoromethane. The latter propellant mixture was added in concentration of 5 % by mass under a pressure of 150 kg/cm$^2$. The mass pressure on the die of the extruder was 80 kp/cm$^2$ and the die temperature was 90° C. The die was an annular die having a diameter of 80 mm and a cooling mandrel of a diameter of 210 mm was employed. With a discharge of 101 kg/hr and a corresponding uptake, a foamed foil of 700 mm width and 2 mm thickness with a density of 0.34 g/cm$^2$ was obtained. After embossing, the surface was closed, free of pores, uniform and smooth. The foam structure was uniform with fine pores with average pore diameter size of 60 to 100 microns. The sheet had distinct leather-like characteristics. It was very flexible and had adequate strength and stability which permits its use without a support member in the leather goods industry. The sheet can be wrinkled without damage. Thereby, it gets the grain typical of leather under the same stress. For the sheet obtained the characteristics were determined:

| | |
|---|---|
| Scratch resistance | 63 strokes |
| Tensile strength | 49 kg/cm$^2$ |
| Tear propagation strength | 9 kg/cm |

EXAMPLE 2

The procedure of example 1 was repeated under the same conditions with the exception that an ethylene vinylacetate copolymer of vinylacetate content of 14 % was employed as the polymer. The leather and textile substitute which are obtained was more flexible and softer with a somewhat lower strength stability than that of Example 1. The density was 0.38 g/cm$^3$; the cell size was in the range of 100 to 150 microns; the tensile strength was 43 kg/cm$^2$; the scratch resistance was 48 strokes and the propagation tear strength was 7 kg/cm.

EXAMPLE 3

The procedure of Example 1 was repeated under the same conditions with the exception that a mixture of 60 % by weight of ethylene vinylacetate copolymer with a 5 % by weight vinylacetate content was employed together with the 40 % by weight of ethylene vinylacetate copolymer having 20 % by weight vinylacetate content. The leather and textile substitute material was softer and more flexible, with a somewhat lower strength, than the material of Example 1. The following characteristics were determined:

| | |
|---|---|
| Density | 0.33 g/cm$^3$ |
| Cellsize between | 70 and 120 microns |
| Scratch resistance | 52 strokes |
| Tensile strength | 45 kg/cm$^2$ |

-continued

| Tear propagation strength | 8 kg/cm. |
|---|---|

EXAMPLE 4

A polymer mixture of 60 % by weight of ethylene vinylacetate copolymer with a vinylacetate content of 5 % by weight, a density of 0.925 g/cm² and a melt index $i_2$ of 3 g/10m, 40 % by weight of polyethylene, the density of 0.915 g/cm³ and a melt index of 8 g/10m was mixed with 0.125 % by weight of citric acid, 0.125 % by weight sodium bicarbonate, 0.4 % by weight of the antistatic agent employed in Example 1, all amounts referred the weight of the polymeric mass. They were fed to the extruder. To the melted polymers a mixture containing nucleation agent, a propellant mixture consisting of 80 % by weight dichlorodifluoromethane and 20 % by weight trichloromonofluoromethane was added. The total amount of the propellant mixture comprised 5 % by weight of the polymeric mass. The same was added at a pressure of 150 kg/cm².

An annular die, having a diameter of 80 mm was employed together with a cooling mandrel having a 210 mm diameter. The pressure of the substance at the die was 85 kg/cm² and the die temperature was about 95°C. With a discharge of about 93 kg/hr and a corresponding draw off velocity, a foamed sheet of about 650 mm width and 2.0 mm thickness with a density of 0.28 g/cm³ was obtained. After embossing, the surface was closed, free of pores and smooth. The foam structure was uniform with fine pores, a pore size between 80 and 150 microns.

The sheet was measured to determine its characteristics which were as follows:

| Scratch resistance | 71 strokes |
|---|---|
| Tensile strength | 54 kg/cm² |
| Tear propagation strength | 9 kg/cm |
| Water vapor permeability | 30 mg/1000 mm². day. |

EXAMPLE 5

The procedure of Example 4 was repeated under the same conditions with the exception of the polymeric mass employed which consisted of:

a. 37.5 % by weight of ethylene vinylacetate copolymer with a vinylacetate content of 5 %, a density of 0.925 g/cm³ and a melt index of $w_2 = 3g/10m$, b. 37.5 % by weight of ethylene vinylacetate copolymer with a vinylacetate content of 14 %, a density of 0.935 g/cm³ and a melt index of $i_2 = 5g/10m$, and c. 25.0 % by weight polyethylene with a density of 0.910 g/cm³ and a melt index of $i_2 = 7$ g/10 min.

The following characteristics were determined:

| Density | 0.35 g/cm³ |
|---|---|
| Scratch resistance | 54 strokes |
| Tensile strength | 52 kg/cm² |
| Pore size | 80 to 150 microns |
| Tear propagation strength | 9 kg/cm |

EXAMPLE 6

The procedure according to Example 4 was repeated under the same conditions with the exception that a polymer mixture was used consisting of:

a. 70 % by weight polyvinylchloride, soft (plasticized) having an average molecular weight of 62,000 and b. 30 % by weight ethylene vinylacetate copolymer with a vinylacetate content of 5 %. The material obtained had particularly great flexibility.

The following characteristics were determined:

| Density | 0.59 g/cm³ |
|---|---|
| Pore size | 100 to 200 microns |
| Scratch resistance | 48 strokes |
| Tensile strength | 45 kg/cm² |
| Tear propagation strength | 7 kg/cm |

EXAMPLE 7

The procedure according to Example 4 was repeated under the same conditions with the exception that a completely saponified ethylene vinylacetate copolymer with an original vinylacetate content of 5 % was used.

The material had higher strength and stiffness as compared with unsaponified copolymer.

The following characteristics were determined:

| Density | 0.32 g/cm³ |
|---|---|
| Pore size | 100 to 160 microns |
| Scratch resistance | 68 strokes |
| Tensile strength | 56 kg/cm² |
| Tear propagation strength | 10 kg/cm |

EXAMPLE 8

The procedure according to Example 4 was repeated under the same conditions with the exception that a polymer mixture consisting of a mixture of 40 % by weight of polyethylene with a density of 0.916 g/cm³ and a melting index $i_2 = 9$ g/10 min and 60 % by weight of completely saponified ethylene vinylacetate copolymerisate with an original vinylacetate content of 5 % by weight was used.

The following characteristics were determined:

| Density | 0.29 g/cm³ |
|---|---|
| Pore size | 80 to 150 microns |
| Scratch resistance | 65 strokes |
| Tensile strength | 50 kg/cm² |
| Tear propagation strength | 9 kg/cm. |

EXAMPLE 9

The procedure according to Example 4 was repeated under the same conditions with the exception that a polymer mixture consisting of 40 % by weight polyethylene with a density of 0.912 g/cm³ and a melting index $i_2 = 8g/10min$, 40 % by weight ethylene vinylacetate copolymer with a vinylacetate content of 5 % by weight and 20 % by weight ethylene vinylacetate with a vinylacetate content of 34 % by weight is used. The material was distinguished by particularly good flexibility or suppleness.

The following characteristics were determined:

| | |
|---|---|
| Density | 0.26 g/cm³ |
| Pore size | 100 to 200 microns |
| Scratch resistance | 50 strokes |
| Tensile strength | 43 kg/cm² |
| Tear propagation strength | 8 kg/cm. |

EXAMPLE 10

The procedure according to Example 4 was repeated under the same conditions with the exception that a polymer mixture consisting of 25 % by weight polyethylene with a density of 0.915 g/cm³ and a melting index $i_2 = 9$ g/10 min, 37.5 % by weight ethylene vinylacetate copolymer with a vinylacetate content of 14 % by weight and 37.5 % by weight of completely saponified ethylene vinylacetate copolymerisate with an original vinylacetate content of 14 % by weight was used.

The following characteristics were determined:

| | |
|---|---|
| Density | 0.30 g/cm³ |
| Pore size | 100 to 150 microns |
| Scratch resistance | 48 strokes |
| Tensile strength | 48 kg/cm² |
| Tear propagation strength | 10 kg/cm. |

EXAMPLE 11

The procedure according to Example 4 was repeated under the same conditions with the exception that a polymer mixture consisting of 35 % by weight polyethylene with a density of 0.912 g/cm³ and a melting index $i_2 = 8$ g/10 min, 50 % by weight ethylene vinylacetate copolymer with a vinylacetate content of 5 % by weight and 15 % by weight poly-ε-caprolactame was used. The sheet obtained was distinguished by higher scratch resistance, but lower flexibility.

The following characteristics were determined.

| | |
|---|---|
| Density | 0.30 g/cm³ |
| Pore size | 100 to 150 microns |
| Scratch resistance | 78 strokes |
| Tensile strength | 52 kg/cm² |
| Tear propagation strength | 8 kg/cm. |

The disclosure of copending application 303,672 of Nov. 2, 1972 is hereby incorporated herein by reference.

The test methods employed for determining the characteristics of a leather substitute materials of the present invention are as follows:

| | | Test Method |
|---|---|---|
| Thickness | 1 to 3 mm | TGL 12972/5 |
| Density | 0.25 to 0.60 g/cm³ | TGL 14075/7-11 |
| Tensile strength | 10 to 60 kg/cm² | TGL 12972/4 |
| Tear propagation strength | 4 to 10 kg/cm² | TGL 0-53329 |
| Water vapor permeability | 20 to 200 mg/1000 mm².day | TGL 0-5333 |
| Scratch resistance | with 0.8 kg load of at least 40 strokes | TGL 13-17 |
| Cell size | 60 to 200 microns | (internal test method) |
| Flexibility | 10 to 100 g.cm | (internal test method) |

A description of these is appended hereto and made a part hereof.

Right before testing all specimens are stored for at least 16 hours at a temperature of 20° C ± 2 degrees and a relative air humidity of 65 % ± 5 %. Under these conditions the samples are tested.

Determination of the Thickness

Distributed across the width of the sheeting 10 specimens having the size of 100 mm × 40 mm are cut or punched across the sheeting. The thickness is measured by means of a thickness gauge between flat, planeparallel, circular gauging surfaces, the distance of which is indicated on a scale having a division value of 0.01 mm. The pressure applied should be 100 grams. The specimen is inserted into the thickness gauge and the thickness is measured at a distance of 20 mm from the edge of the specimen. The gauging surface of the thickness gauge are approached to the specimen up to about 0.5 mm and are then released by releasing the spring lever. The gauging surface should bear on the specimen without being sight tilted. Each specimen is measured each once at five different places with an accuracy of up to 0.01 mm, and the arithmetic mean is taken from the result.

Determination of the Density

Distributed across the width of the sheeting 10 specimens having the size of 100 mm × 40 mm are cut or punched across the sheeting. The density is determined from the weight and the volume. The weight of the specimens is determined by weighing. The volume is determined by calculations from the dimensions which are determined with an accuracy of up to 0.1 mm. Each sample is measured each once at five different places, and the density is calculated according to the formula $$\rho \frac{\text{weight}}{\text{volume}} [\text{g/cm}^3]$$

From the results the arithmetic mean is taken.

Determination of the Tensile Strength

From the sheeting 10 specimens, which are distributed across the width and have the size of 200 mm × 40 mm, are taken across the sheeting and at a distance of not less than 100 mm from the edge of the sheeting. The tensile test is carried out by means of a tensile testing machine. The thickness of the specimen is determined at three places within the free testing length of 100 mm, and the specimen is then extented with a constant rate of feed of 100 mm/minute of the lower jaw until it tears. The maximum tensile load is read with an accuracy of 0.2 % of the full-scale value. Tests, in which the specimen tears outside the free testing length, are repeated. On the basis of the maximum tensile load in kg/40 mm of the width of the specimen the tensile strength is calculated according to the formula $$\sigma_z = \frac{P}{F} = \frac{\text{force}}{\text{width} \times \text{min. thickness}} \text{kg/cm}^2$$

Determination of the Tear Propagation Strength (Tear Resistance)

From the sheeting 20 specimens, which are distributed across the width and have the size of 200 mm × 30 mm are taken, that is each 10 specimens longitudinal and 10 specimens across the sheeting. From a narrow edge towards the centre (each 20 mm distance from the longitudinal edge and parallel to it) the specimen is cut in at a length of 50 mm. The two tongues obtained by notching the specimen (distance between grips is 100 mm) are each clamped into a grip of the tensile testing machine and loaded. The load is steadily increased with a rate of feed of 100 mm/minute till the tear propagates. The tear propagation is continued till the testing strip has torn in its longitudinal direction. In case that the strip tears sidewise the test will be repeated. For the tear propagation strength the value is given in kg which results as the average value of the load fluctuates somewhat over the total tensile period. The arithmetic mean is obtained either by means of the planimetric evaluation of the tearing diagram or by calculations from at least five readings in periodical time intervals. The tear propagation strength is given in kg/cm of thickness and is calculated according to the formula $$\frac{\text{kg mean load} \times 10}{\text{mm of thickness}} [\text{kg/cm}]$$

The thickness is measured three times below the cut and in the direction of the cut.

Determination of the Water Vapour Permeability

Three circular specimens having a diameter of 60 mm and being distributed across the width of the sheeting are taken from the sheeting. A glass vessel having a height of 45 mm and a diameter of 60 mm serves as a testing equipment, on which a metallic screw plug with a free circular opening of 1000 mm² of testing surface can be screwed. 50 cm³ of water are filled into this vessel. Then the specimens are placed on and the testing system is sealed by means of a rubber ring and the screw plug. At first the sealed system is kept for 24 hours at a temperature of 20° C ± 2° in an exsiccator which is filled with silicagel. Then the weight of the sealed testing system is determined on an analytical balance. After 24 hours the weighing is repeated over a period of two days. The water vapour permeability is calculated on the basis of the mean decrease of the weight within 24 hours. The value is given in $\frac{\text{mg}}{1000 \text{ mm}^2 \times \text{day}}$ at a temperature of 20°C

Determination of the Scratch Resistance

At a distance of not less than 100 mm from the edges of the sheeting and distributed across the sheeting 10 specimens having the size of 150 mm × 50 mm are cut or punched lengthwise. The test is carried out with a rubbing testing equipment, to which the specimen is fastened by means of metal pins on a suitable solid support. After the specimen has been clamped a rubbing pin with a load of 0.8 kg is attached. The rubbing pin has a spherical surface. It has a diameter of 8 mm and a the radius of the cap is 4 mm. In the course of the test the specimen is moved to and for at a room temperature of 20° to 25° C over a distance of 100 mm. The speed is 100 mm/second. The specimen is moved till a cracking of the top layer is observed. The scratch resistance is stated as number of strokes necessary to observe the first cracking of the top layer of specimen. From the results of the 10 specimens the arithmetic mean is taken.

Determination of the Cell Size

By means of a razor blade specimens having the size of about 1.5 mm × 20 mm are taken at two arbitrary places of the sheeting perpendicular to the foaming direction. A photograph with 30-fold enlargement of the area of the cut is taken with incident light of the two specimens arranged parallel to each other. The size of the photograph is 16 cm × 23 cm. On this photograph the mean diameters of the individual foam cells are measured. An idea of the cell distribution is obtained from the number of cells per square centimeter or from the diagram resulting from the measured values.

Determination of the Flexibility

At a distance of not less than 100 mm from the edge of the sheeting and distributed across the width of the sheeting 20 specimens having the size of 20 mm × 50 mm are taken from the sheeting, each 10 specimens longitudinal and 10 specimens transversely. The determination of the flexibility is performed by means of a flexibility tester, with which the bending force is measured which is required in order to obtain a specified deflection with a specimen having been clamped at one side. The specimen, having been clamped perpendicularly into a clip being able to rotate round its tip, is pressed against the force lever of an inclination balance by the rotation of the clip, till the desired deflection or the required bending force has been reached. The free force lever is coaxially carried with the chucking clip. In order to transmit the pressure of the specimen it is provided with a pressure pin, the axial distance of which from the axle of the chuck being one centimeter. The angular motion of the connecting line between the pivot of the chuck and the point at which the pressure pin is touched by the specimen serves as a measure for the deflection of the specimen. This angle of deflection is obtained at the apparatus as the difference between the angular motion of the chuck and the angular response of the force lever. It is directly taken from an angular scale which is fastened to the chuck.

In order to perform the measurement the required load is mounted on the force indicator. It is chosen in such a way that the reading will be between 25 and 75 divisions on the scale at an angle of deflection of 30° C. After the force indicator has been set to zero by means of a levelling screw the specimen is placed into the horizontal chuck in such a way that it projects 20 mm. Then the chuck is turned so far to the right that the specimen touches the fork bar. In this zero setting of the force indicator the slidable angular scale is set to zero. Then within two to four seconds the head of the chuck with the clamped specimen is steadily turned to the right till the fork indicator indicates an angle of deflection of 30° C. In this position of the fork indicator the indicated value is exactly read from a scale division. The flexibility is determined separately for the top side and the back of the specimens. The flexibility B is calculated according to the formula $$B = \frac{F \times S}{100} [g\ cm]$$

F = slipped over load in grams
S = indicated scale divisions

What is claimed is:

1. An unsupported leather or textile substitute in the form of a cellular, porous, foamed unsupported sheet having:
   a. a thickness of 1 to 3 mm;
   b. a density of 0.25 to 0.60 g/cm$^3$;
   c. an average cell diameter size of 60 to 200 microns;
   d. a tensile strength between 10 and 60 kg/cm$^2$;
   e. a tear strength propagation between 4 and 10 kg/cm$^2$; and
   f. a flexibility of 10 to 100 g. cm;
   g. a water vapor permeability between 20 and 200 mg/1000mm$^2$. day;
   h. a scratch resistance with 0.8 kg load of at least 40 strokes, wherein said sheet consists essentially of a resinous material, the resin of said resinous material consisting of a member selected from the group consisting of:
   1. A polyethylene having a density of 0.910 to 0.925 g/cm$^2$ and a melting index $i_2$ of 1.1 to 15.0 g/10 min;
   2. an ethylene vinylacetate copolymer containing 5 to 20 % by weight of vinylacetate and having a density of 0.920 to 0.940 g/cm$^3$ and a melting index $i_2$ of 1.1 to 10.0 g/10 min;
   3. a mixture of the polyethylene of paragraph 1 and the ethylene vinylacetate copolymer of paragraph 2 said mixture having a total content of vinylacetate to 15 % by weight;
   4. a mixture of the polyethylene of paragraph 1 and the ethylene vinylacetate copolymer of paragraph 2 and an ethylene vinylacetate copolymer containing 30 to 35 % by weight of vinylacetate and having a density of 0.950 to 0.960 g/cm$^3$ and a melting index $i_2$ of 1.1 to 10.0 g/10 min, said mixture having a total content of vinylacetate to 15 % by weight;
   5. a partly saponified ethylene vinylacetate copolymer produced from the ethylene vinylacetate copolymer of paragraph 2 containing less than 1.5 % by weight of saponified vinylacetate groups;
   6. a mixture of the polyethylene of paragraph 1 and the partly saponified ethylene vinylacetate copolymer of paragraph 5;
   7. a completely saponified ethylene vinylacetate copolymer produced from the ethylene vinylacetate copolymer of paragraph 2;
   8. a mixture of the polyethylene of paragraph 1 and the completely saponified ethylene vinylacetate copolymer of paragraph 7;
   9. a mixture of ethylene vinylacetate copolymers having different contents of vinylacetate said mixture having a total content of vinylacetate of 5 to 20 % by weight;
   10. a mixture of the ethylene vinylacetate copolymer of paragraph 2 and the partly saponified ethylene vinylacetate copolymer of the paragraph 5;
   11. a mixture of the ethylene vinylacetate copolymer of paragraph 2 and the completely saponified ethylene vinylacetate copolymer of paragraph 7;
   12. a mixture of the polyethylene of paragraph 1 the ethylene vinylacetate copolymer of paragraph 2 and the completely saponified ethylene vinylacetate copolymer of paragraph 7;
   13. a mixture of 20 to 99 % by weight polyvinyl chloride having an average molecular weight of 55,000 to 75,000 and 1 to 80 % by weight of the ethylene vinylacetate of paragraph 2;

said composition containing up to 20 % by weight of an agent selected from the group consisting of polyamide, polycondensate, reinforcing material, antistatic agents, softening agent, stabilizer, dye and pigment.

2. A composition according to claim 1, wherein said resinous agent is free of another resin forming agent.

3. A sheet according to claim 1, containing less than 10 % by weight plasticizer.

4. A sheet according to claim 1, free of plasticizer.

5. A sheet according to claim 1, comprising a mixture of said polyethylene, ethylene vinylacetate copolymer and saponified ethylene vinylacetate copolymer.

6. A composition according to claim 5, wherein the polyethylene is present in the amount between 20 and 50 % by weight, the ethylene vinylacetate copolymer is present in the amount between 40 and 25 % by weight, the saponified ethylene vinylacetate copolymer is present in the amount between 40 and 25 % by weight.

7. A foam sheet according to claim 6, consisting of the mixture 40 % by weight polyethylene, 40 % by weight ethylene vinylaceatet copolymer having a vinylacetate content of 5 to 7 % by weight, and 20 % by weight of saponified ethylene vinylacetate copolymer having a vinylacetate content of 30 to 35 % by weight.

8. A foam sheet according to claim 1, comprising a mixture of 25 to 75 % by weight of said polyethylene, and 75 to 25 % by weight of ethylene vinylacetate copolymer having a vinylacetate content of 2 to 15 % by weight.

9. An unsupported leather or textile substitute according to claim 1, comprising a mixture of 50 to 99 % by weight of an ethylene vinylacetate copolymer with a vinylacetate content of 5 to 10 % by weight and 50 to 1 % by weight of ethylene vinylacetate copolymer having a vinylacetate content of 10 to 20 % by weight, said ethylene vinylacetate copolymer having different vinylacetate contents.

10. A leather substitute material according to claim 1, comprising between 50 and 80 % by weight of polyvinyl chloride of the molecular weight between 60,000 and 65,000 and between 50 and 20 % by weight of ethylene vinylacetate copolymer having a vinylacetate content of between 5 and 35 % by weight.

11. A leather substitute material according to claim 10, comprising a mixture of 70 % by weight of polyvinyl chloride, 30 % by weight of ethylene vinylacetate copolymer.

12. A composition according to claim 10, wherein said polyvinyl chloride is a plasticized or unplasticized polyvinyl chloride.

13. A leather substitute material according to claim 1, containing poly-e-caprolactam.

* * * * *